Feb. 15, 1949.   H. NEUWIRTH   2,461,915
TRIPOD LEG
Filed March 8, 1946
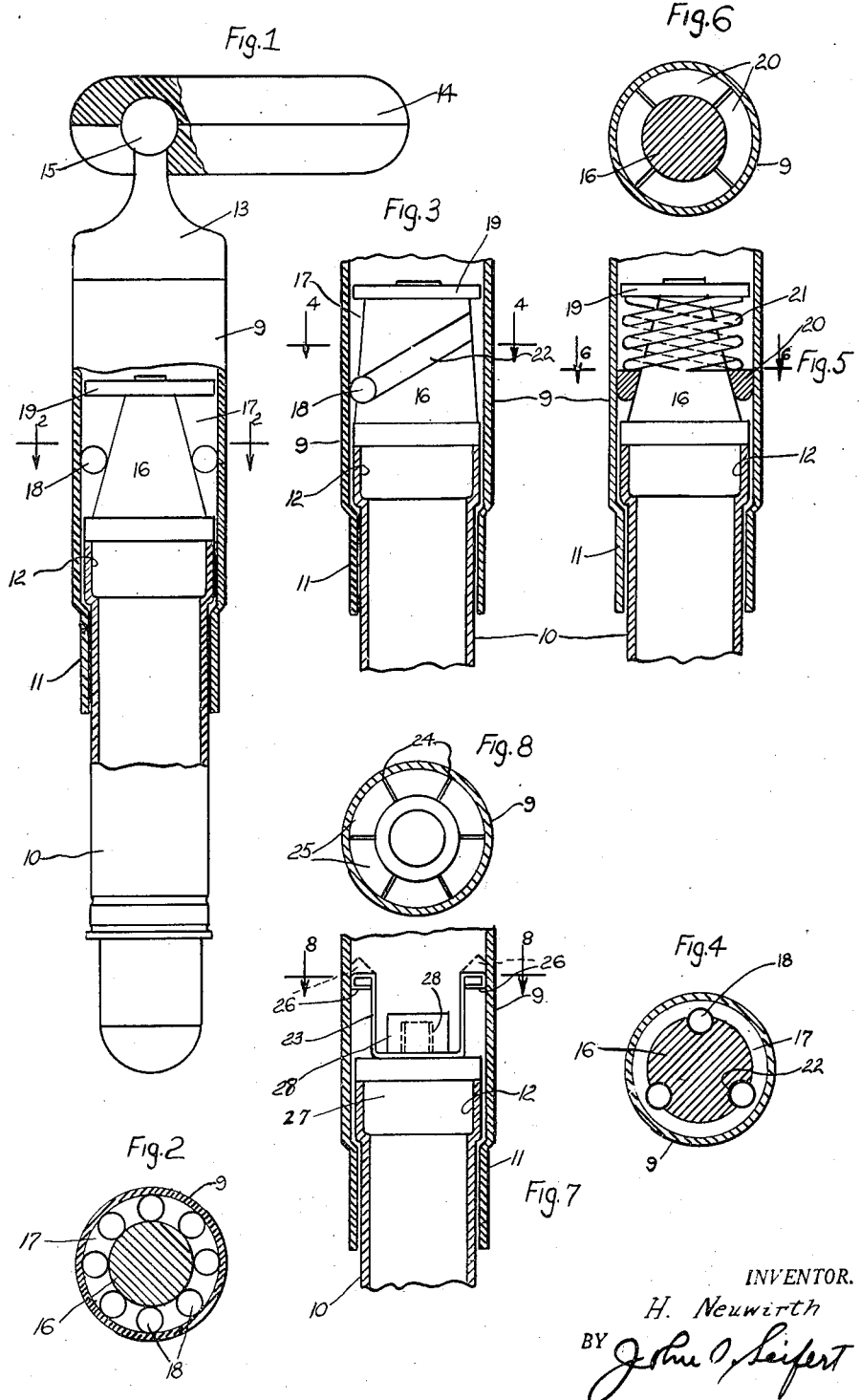
INVENTOR.
H. Neuwirth
BY John O. Seifert
Attorney Patented Feb. 15, 1949

2,461,915

UNITED STATES PATENT OFFICE 2,461,915

TRIPOD LEG

Herman Neuwirth, New York, N. Y., assignor to Testrite Instrument Co., Inc., New York, N. Y., a corporation of New York Application March 8, 1946, Serial No. 652,895

1 Claim. (Cl. 248—191)

This invention relates to tripod legs adjustably connected to a supporting base or head for a camera or other instrument and comprising tubular telescoping sections adapted to be adjusted outwardly from each other to provide legs of different lengths for varying the height at which the supporting head or base is to be positioned in use and means to releasably secure or lock the leg sections in adjusted position, and said sections adapted to be adjusted relative to each other when released to arrange the legs of shortened compact form to facilitate transporting and storing the tripod.

It is the object of the invention to provide an improved telescoping tripod leg structure of this character and means for releasably securing the leg sections in adjusted position, which is simple in construction and efficient in use.

It is another object of the invention to provide improved means for releasably securing or locking together the telescoping sections of a tripod leg to prevent telescoping movement of the leg sections, comprising means carried at an end of one of the sections and confined within the other leg section operative by movement of the leg sections relative to each other in one direction to secure or lock the leg sections and automatically release the leg sections to permit of telescoping adjustment thereof by movement of the leg sections relative to each other in the opposite direction.

Other objects and advantages of the invention will be apparent from the description of the construction and arrangement of the tripod leg and securing or locking means.

In the drawing accompanying and forming a part of this application Figure 1 is a longitudinal sectional view of a tripod leg showing an embodiment of the means for releasably securing or locking together the telescoping sections of a tripod leg.

Figure 2 is a sectional view taken on the line 2—2 of Figure 1.

Figure 3 is a longitudinal sectional view of a portion of the telescoping sections of a tripod leg and showing modified means embodying the invention for releasably securing or locking together the telescoping sections of a tripod leg.

Figure 4 is a sectional view taken on the line 4—4 of Figure 3.

Figure 5 is a view similar to Figure 3 but showing modified means embodying the invention for releasably securing or locking together the telescoping sections of a tripod leg.

Figure 6 is a sectional view taken on the line 6—6 of Figure 5.

Figure 7 is a view similar to Figure 3 showing further modified means embodying the invention for releasably securing or locking together the telescoping sections of a tripod leg; and Figure 8 is a sectional view taken on the line 8—8 of Figure 7.

In carrying out the invention as illustrated in Figures 1 and 2 the tripod supporting leg comprises tubular sections, shown as two in number 9 and 10, the section 10 being of less diameter than and slidable in the section 9. To limit the outward movement of the leg sections the outer leg section 9 is reduced in diameter at the outer end, as at 11, to substantially the diameter of the inner section 10 and the inner end of the section 10 is arranged of increased diameter substantially equal to the inner diameter of the leg section 9, as at 12, the shoulder formed by said enlarged portion being adapted to engage the shoulder formed by the reduced portion 11. The leg section 10 is mounted in the section 9 by engaging it into the end of the section 9 opposite the reduced end 11, and said outer end of section 9 is closed by a cap member 13 suitably connected to said end of the leg section 9, as by a screw threaded connection, the cap member 13 being arranged to pivotally connect the leg to a supporting base or head 14, as at 15, to have angular adjustment relative to said head 14, there being three legs connected to said head equidistantly spaced about the same, and the head adapted for the mounting of a camera or other instrument thereon.

To releasably secure or lock the leg sections together in different adjusted positions the end of the section 10 disposed within the section 9 is arranged with a head portion 16 the outer surface of which inclines outwardly toward the axis of the leg section. As shown this head is of truncated conical form with the base of a diameter substantially the same as the enlarged portion 12 at the end of the leg section 10 and the internal diameter of the leg section 9. The head 16 forms an annular space between the periphery of the head and the wall of the leg section 9 of progressively increasing cross section from the base of the head to the outer end thereof and having freely moving members 18 therein disposed in a circular row adapted by the frictional engagement thereof with the peripheral surface of the head and the inner surface of the leg section 9 and telescoping movement of the leg sections toward each other to be wedged between the head 16 and the leg section 9 and thereby securing or locking the leg sections together, and said wedging engagement of said members with the head 16 and the leg section being augmented by the force of the weight of the tripod head and the camera or other instrument mounted thereon transmitted to the leg section 9 and through the wedge members to the leg section 10 and tending to more firmly and securely connecting the leg sections together. These freely movable members, as shown, comprise a series of balls disposed in a circular row in the space 17 and confined therein by a plate 19 of a diameter substantially equal to the internal diameter of the leg section 9 secured to the outer end of the head portion 16. By movement of the leg section 10 outwardly from the leg section 9 and movement of the leg section 9 in the opposite direction the wedge members 18 are moved out of wedging position and release the leg sections whereby the leg section 10 may have telescoping movement into the leg section 9. Should it be desired to release the leg sections when the leg section 10 is adjusted to its outermost position, as shown in Figure 1, to effect movement of the wedge members out of wedging position the leg 9 is angularly adjusted on its pivotal connection with the camera supporting base 14 so that it will extend at an acute angle to the top of said base or head. The head 16 may be formed integral with the leg section 10 or constructed separately therefrom and mounted in the enlarged end portion at the end of said leg section, as shown.

The construction and arrangement of the tripod leg shown in Figures 5 and 6 is the same as that shown in Figures 1 and 2. However, the wedge members consist of segments 20 arranged to ring form when disposed in the space 17 between the head 16 and leg section 9, and said segments 20 are yieldingly urged to wedging position by a coil spring 21 coiled about the head 16 and confined between the plate 19 and the segmental members 20.

The construction and arrangement of tripod leg shown in Figures 3 and 4 is the same as that shown in Figures 1 and 2 except that the balls 18 instead of being disposed in a circular row in the space 17 between the head portion 16 and the leg section 9 there are only three balls engaged in three recesses or spiral grooves 22 opening at one end through the side of the head 16 at the base thereof and the grooves extending to the opposite end of the head. In this arrangement the leg sections are secured or locked together by wedging the balls between the wall of the leg section 9 and the bottom of the grooves effected by imparting rotative movement to the leg section 10 to the right and thereby causing the balls to be impinged against the wall of the leg section 9 and wedged between said wall and the bottom of the grooves 22. To move the balls out of wedging position and release the leg sections 9, 10 and permit telescoping adjustment of the leg sections rotative movement is imparted to the leg section 10 in the opposite direction or to the left.

In the arrangement of Figures 7 and 8 the leg sections are of the same structure as in Figures 1 to 6. However, the means to releasably secure or lock the leg sections together comprises a cup member 23 having the body or side wall at the open end flanged laterally at a right angle, as at 25, and said flange arranged as a series of segmental sections by radial slits or incisions 24 equidistantly spaced about the flange, and said segmental sections flanged laterally upon themselves substantially to rectangular form, as at 26, with the end terminating adjacent the body of the cup member and the flanged segmental sections circumscribing a circle having a diameter substantially the same as the internal diameter of the leg section 9. The cup member is carried at the end of the leg section 10 within the leg section 9, for which purpose the bottom of the cup member is juxtaposed to a plug 27 seated in the enlarged end 12 of the leg section 10 and secured thereto by a screw extended through an opening in a block 28 juxtaposed to the inside of the bottom of the cup member opposed to the plug 27 and the screw threaded into an opening in said plug 27. The flanges of the cup member 23 are arranged so that the rectangular flanged portions 26 frictionally engage the inner surface of the leg section 9 and any force applied to the leg sections acting to move the leg section 10 into the leg section 9 will more firmly impinge said portions 26 against the section 9 and more securely secure or lock the leg sections together. Any force applied to the leg section 10 acting to move the same outwardly from the leg section 9 will cause said portions 26 to be flexed on the connection thereof with the side wall of the cup member, as shown in dotted lines in Figure 7, said cup member being made of resilient material.

Having described my invention, I claim:

A tripod supporting leg comprising tubular telescoping sections, the one leg section having a truncated conical head at the end within the other leg section arranged with spiral grooves in the outer surface thereof, and balls movably engaging in said grooves between said conical head and the outer leg section adapted by the rotative movement of the telescoping leg sections relative to each other in one direction to be wedged between said grooves and the outer leg section and secure the leg sections together, and by the rotative movement of the leg sections in the opposite direction move said balls out of wedging position and release the leg sections.

HERMAN NEUWIRTH.

REFERENCES CITED

The following references are of record in the file of this patent:

UNITED STATES PATENTS

| Number | Name | Date |
|---|---|---|
| 1,867,559 | Beck | July 19, 1932 |
| 1,194,551 | Schossler | Aug. 15, 1916 |
| 2,019,753 | Wittel | Nov. 5, 1935 |
| 2,261,505 | Schlesinger | Nov. 4, 1941 |